United States Patent
Ahn et al.

(10) Patent No.: US 9,954,851 B2
(45) Date of Patent: Apr. 24, 2018

(54) METHOD FOR CONTROLLING VEHICLE SECURITY ACCESS BASED ON CERTIFICATE

(71) Applicant: Hyundai Motor Company, Seoul (KR)

(72) Inventors: Hyun Soo Ahn, Seoul (KR); A Ram Cho, Gyeonggi-do (KR); Ho Jin Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 139 days.

(21) Appl. No.: 14/963,375

(22) Filed: Dec. 9, 2015

(65) Prior Publication Data

US 2017/0063842 A1   Mar. 2, 2017

(30) Foreign Application Priority Data

Aug. 24, 2015   (KR) .................. 10-2015-0118978

(51) Int. Cl.
*H04L 29/06*   (2006.01)

(52) U.S. Cl.
CPC .......... *H04L 63/0823* (2013.01); *H04L 63/10* (2013.01)

(58) Field of Classification Search
CPC ............................. H04L 63/0823; H04L 63/10
See application file for complete search history.

(56) References Cited

U.S. PATENT DOCUMENTS

| | | | | |
|---|---|---|---|---|
| 5,878,144 A * | 3/1999 | Aucsmith | ............... | G06F 21/32 380/30 |
| 6,802,002 B1 * | 10/2004 | Corella | ................. | G06F 21/33 713/155 |
| 7,050,892 B1 * | 5/2006 | Liebl | ..................... | G06F 21/121 701/32.6 |
| 7,213,262 B1 * | 5/2007 | Elley | .................... | G06F 21/6218 709/229 |
| 7,272,625 B1 * | 9/2007 | Hannel | ............... | H04L 63/0218 709/200 |
| 7,631,183 B2 * | 12/2009 | Brown | ................... | H04L 9/3265 380/282 |
| 7,730,145 B1 * | 6/2010 | Frenkel | ................ | G06Q 10/107 709/206 |

(Continued)

FOREIGN PATENT DOCUMENTS

| | | |
|---|---|---|
| JP | 2007-194878 A | 8/2007 |
| JP | 2007-196852 A | 8/2007 |

(Continued)

OTHER PUBLICATIONS

Mustafa Saed, Muhammad Rizwan, Vehicle Communication and Infrastructure Security: Initial Thoughts, Int'l Conf. Security and Management, SAM'15, 2015.*

(Continued)

*Primary Examiner* — David García Cervetti
(74) *Attorney, Agent, or Firm* — Mintz Levin Cohn Ferris Glovsky and Popeo, P.C.; Peter F. Corless

(57) ABSTRACT

A method for controlling access security at a vehicle gateway of a vehicle including at least one control unit in communication with the vehicle gateway includes: receiving a certificate from a diagnosis device; recognizing a rating of the certificate; and performing at least one of an integrity checking process and a security key authorization process according to the rating of the certificate to determine whether the diagnosis device is allowed to access to the vehicle.

20 Claims, 7 Drawing Sheets

(56) References Cited

U.S. PATENT DOCUMENTS

| | | | |
|---|---|---|---|
| 9,590,809 B2 * | 3/2017 | Hueger | B60K 37/06 |
| 9,767,627 B2 * | 9/2017 | Soroko | G07C 9/00007 |
| 9,773,127 B2 * | 9/2017 | Yanagi | G06F 21/645 |
| 2002/0023223 A1 * | 2/2002 | Schmidt | B60R 25/24 713/187 |
| 2002/0135466 A1 | 9/2002 | Bunyan | |
| 2004/0030887 A1 * | 2/2004 | Harrisville-Wolff | H04L 63/0442 713/155 |
| 2004/0098581 A1 * | 5/2004 | Balfanz | H04L 12/1818 713/155 |
| 2004/0128504 A1 * | 7/2004 | Kivinen | H04L 9/006 713/158 |
| 2004/0139315 A1 * | 7/2004 | Tokutani | H04L 63/0435 713/156 |
| 2005/0125669 A1 * | 6/2005 | Stewart | H04L 63/0492 713/171 |
| 2006/0255910 A1 * | 11/2006 | Fukushima | B60R 25/04 340/5.65 |
| 2007/0223702 A1 * | 9/2007 | Tengler | H04L 9/3263 380/270 |
| 2007/0234432 A1 * | 10/2007 | Korkishko | H04L 63/0492 726/27 |
| 2008/0027602 A1 * | 1/2008 | Yeap | B60R 25/04 701/31.4 |
| 2008/0091941 A1 * | 4/2008 | Yonezawa | H04L 9/3255 713/158 |
| 2009/0228705 A1 * | 9/2009 | Cho | H04L 9/3226 713/158 |
| 2009/0235071 A1 * | 9/2009 | Bellur | H04L 9/3268 713/158 |
| 2009/0249074 A1 * | 10/2009 | Madhavan | H04L 9/3263 713/176 |
| 2009/0259841 A1 * | 10/2009 | Laberteaux | H04L 9/3268 713/156 |
| 2009/0260057 A1 * | 10/2009 | Laberteaux | H04L 63/0823 726/2 |
| 2010/0005280 A1 * | 1/2010 | Wagner | G06F 21/6209 713/1 |
| 2010/0023760 A1 * | 1/2010 | Lee | G06F 21/10 713/158 |
| 2010/0031025 A1 * | 2/2010 | Zhang | H04L 63/0823 713/156 |
| 2010/0054698 A1 * | 3/2010 | Isozaki | G06F 21/10 386/252 |
| 2011/0083011 A1 * | 4/2011 | DiCrescenzo | H04L 9/006 713/158 |
| 2011/0126002 A1 * | 5/2011 | Fu | H04L 63/0823 713/156 |
| 2011/0191581 A1 * | 8/2011 | Shim | H04L 67/12 713/158 |
| 2011/0258435 A1 * | 10/2011 | Bellur | H04L 9/3273 713/158 |
| 2012/0023327 A1 * | 1/2012 | Nagasaki | H04L 63/0823 713/156 |
| 2012/0023560 A1 * | 1/2012 | Yanagi | G06F 21/33 726/6 |
| 2013/0073174 A1 * | 3/2013 | Worden | F02D 41/22 701/102 |
| 2013/0073175 A1 * | 3/2013 | Banerjee | F02D 41/0097 701/102 |
| 2013/0184929 A1 * | 7/2013 | Salman | G05B 23/0283 701/31.5 |
| 2015/0140986 A1 * | 5/2015 | Lamb | H04L 12/2898 455/418 |
| 2016/0012653 A1 * | 1/2016 | Soroko | G07C 9/00007 340/5.61 |
| 2016/0025027 A1 * | 1/2016 | Mentele | F02D 41/22 701/102 |
| 2017/0093866 A1 * | 3/2017 | Ben-Noon | H04L 9/3234 |

FOREIGN PATENT DOCUMENTS

| | | |
|---|---|---|
| KR | 2005-0077568 A | 8/2005 |
| KR | 10-2010-0068027 A | 6/2010 |
| KR | 10-1216110 B1 | 12/2012 |
| KR | 10-2014-0080057 A | 6/2014 |
| KR | 10-1406192 B1 | 6/2014 |
| KR | 10-1480605 B1 | 1/2015 |
| KR | 10-1527779 B1 | 6/2015 |

OTHER PUBLICATIONS

Samuel Woo et al., A Practical Wireless Attack on the Connected Car and Security Protocol for In-Vehicle CAN, IEEE, Apr. 2015.*

Kleberger et al., Short Paper: Formal Verification of an Authorization Protocol for Remote Vehicle Diagnostics, IEEE, 2013.*

Sedaghat et al, Investigation and Reduction of Fault Sensitivity in the FlexRay Communication Controller Registers, Springer, 2008.*

* cited by examiner

METHOD FOR CONTROLLING VEHICLE SECURITY ACCESS BASED ON CERTIFICATE

CROSS-REFERENCE TO RELATED APPLICATION

This application claims priority to and the benefit of Korean Patent Application No. 10-2015-0118978, filed on Aug. 24, 2015 in the Korean Intellectual Property Office, the disclosure of which being hereby incorporated by reference as if fully set forth herein.

TECHNICAL FIELD

The disclosure relates generally to a method and an apparatus for controlling vehicle security access, and more particularly to a device and a method, adapted in a vehicle, capable for collecting, and analyzing, the validity term of certificate and certificate revocation list, according to a certificate's rating, in order to control access security for use in a vehicle.

BACKGROUND

Recently, numerous electric control devices have been adopted in vehicles so as to enhance a driver's safety and convenience. An in-vehicle network generally supports communication among the electric control devices in the vehicle.

However, as the number of electric control devices in the vehicle increases, maintain security of the vehicle becomes a critical issue for driving safety. Accordingly, in order to diagnose a controller for use in a vehicle and/or update data stored in the controller, an authentication process against an external diagnostic device is required.

In a typical authentication process between the controller inside the vehicle and the external diagnostic device, the controller transmits a seed value to the diagnostic device in response to the device's authentication request, and the diagnostic device generates a key value based on the seed value. The generated key value is delivered into the controller, and the controller compares the delivered key value with another key value internally generated based on a predetermined algorithm. If the delivered key value is equal to the internally generated key value, the diagnostic device is allowed to access the controller inside the vehicle.

However, the above-described method using seed-key values utilizes a unique algorithm which should be kept in secret for security. Thus, when the corresponding algorithm is open, leaked, hacked, or known in public, security can be broken.

In U.S. Patent Application Publication No. 2002/0135466, titled "Vehicle Security System and Method," filed on Feb. 14, 2002 and published on Sep. 26, 2002, a mobile device sends a request message, containing the vehicle identity and device identity, to a remote authentication server via a wireless communication technology. Then, the authentication server performs plural processes for authentication. If the authentication is successful, the mobile device allows the vehicle to be started.

Referring to the Korean Patent No. 10-1216110, titled "Method and System for Distributing Certificate Revocation List for Vehicle Communication, Apparatus for Acquiring Certificate Revocation List thereof," filed on May 18, 2011 and issued on Dec. 20, 2012, a certificate revocation list (CRL) transmitted from a distribution device for communicating with a vehicle is converted, based on a protocol of multimedia object transfer (MOT) for Terrestrial-Digital Multimedia Broadcasting (T-DMB), into a CRL data which can be transmitted by a device in the vehicle. Then, a broadcasting relay apparatus distributes the converted CRL data via a data broadcasting channel for T-DMB.

In the Japanese Patent Publication No. 2007-196852, titled "Authentication Device, Authentication Method, and Vehicle Control Device," filed on Jan. 26, 2006 and published on Aug. 9, 2007, an authentication device for use in a vehicle communicates with an available mobile device and acquires authentication information from the mobile device. The acquired authentication information is compared with authentication information registered in the authentication device. If the acquired authentication information is equal to the registered authentication information, the authentication is successful, and a lock of each control unit in the vehicle is released.

However, above-mentioned publications demonstrate how to control the driver's access to a vehicle, not how to authenticate an external diagnostic device to thereby allow access to the vehicle. It is not described how to collect, and analyze, security-related information according to a certificate's rating in order to control access security for use in a vehicle.

SUMMARY

Embodiments of the disclosure are directed to a method and an apparatus for controlling access security for use in a vehicle based on a certificate. Embodiments of the disclosure provide a method and an apparatus operable to adaptively collect security-related information according to a certificate's rating and to control whether a diagnostic device is allowed based on the certificate to securely access to a vehicle.

A method for controlling access security at a vehicle gateway of a vehicle including at least one control unit in communication with the vehicle gateway includes: receiving a certificate from a diagnosis device; recognizing a rating of the certificate; and performing at least one of an integrity checking process and a security key authorization process according to the rating of the certificate to determine whether the diagnosis device is allowed to access to the vehicle.

The integrity checking process can include a validity term checking process for verifying a term of validity in the received certificate, and a certificate revocation list checking process for determining whether the received certificate is included in a certificate revocation list. At least one of the validity term checking process and the certificate revocation list checking process can be performed according to the rating of the certificate.

The validity term checking process can includes either acquiring current date information from a vehicle head unit coupled to the vehicle gateway via an in-vehicle network or directly obtaining the current date information throughout a mobile communication network by the vehicle gateway. Then, it is determined whether the term of validity has ended by comparing an expiration date included in the received certificate with the current date information.

When the term of validity has expired, a connection between the diagnosis device and the vehicle can be blocked.

The current date information is acquired by a mobile device engaged with the vehicle head unit via a Bluetooth pairing.

The current date information is obtained from a communication module of a Global Positioning System (GPS) in the vehicle head unit.

The in-vehicle network includes at least one of a controller area network (CAN), an Ethernet network, a local interconnect network (LIN), and a FlexRay network.

The certificate revocation list checking process can include requesting and obtaining the certificate revocation list at a vehicle head unit coupled to the vehicle gateway via an in-vehicle network, and determining whether the received certificate is included in the certificate revocation list.

The certificate revocation list can be acquired from a mobile device engaged with the vehicle head unit via a Bluetooth pairing.

The certificate revocation list which is the latest version can be obtained from an authorization server by a predetermined application installed in the mobile device.

The certificate revocation list can be acquired from an authorization server engaged with the vehicle head unit via a telematics network.

When the certificate delivered from the diagnosis device, a connection between the diagnosis device and the vehicle can be blocked.

The certificate can include information about a possessor's role and power, and the rating of the certificate is distinguished based on the information about the possessor's role and power.

The method may further include decoding an electronic signature encrypted based on a personal key of an authorization server using a public key of the authorization server, which is previously stored, to determine a validity of the electronic signature. The encrypted electronic signature may be included in the received certificate.

The security key authorization process may be performed after the integrity checking process is successfully completed when the integrity checking process is performed in response to the rating of the certificate.

The certificate revocation list checking process can include transmitting a certificate revocation inquiry message including certificate identification information to an authorization server; and receiving a certificate revocation response message containing predetermined identification information indicating whether the certificate is revoked.

Furthermore, according to embodiments of the present disclosure, an apparatus for controlling access security in a vehicle includes: a communication unit receiving a certificate from a diagnosis device; a certificate rating identification unit recognizing a rating of the certificate; an integrity check unit performing an integrity checking process according to the rating of the certificate; and a control unit controlling an execution of at least one of an integrity checking process and a security key authorization process according to the rating of the certificate to determine whether the diagnosis device is allowed to access to the vehicle.

The integrity check unit can includes: a validity term checking unit verifying a term of validity in the received certificate, and a certificate revocation list checking unit determining whether the received certificate is included in a certificate revocation list. The control unit controls the execution of at least one of the validity term checking unit and the certificate revocation list checking unit according to the rating of the certificate.

The validity term checking unit can either acquire current date information from a vehicle head unit of the vehicle coupled to a vehicle gateway of the vehicle via an in-vehicle network or directly obtain the current date information via a mobile communication network by the vehicle gateway. It is determined whether the term of validity has ended by comparing an expiration date included in the received certificate from the diagnosis device with the current date information.

The controller can block a connection between the diagnosis device and the vehicle when the term of validity has expired.

The current date information can be acquired by a mobile device engaged with the vehicle head unit via a Bluetooth pairing.

The current date information can be obtained from a communication module of a Global Positioning System (GPS) in the vehicle head unit.

The in-vehicle network can include at least one of a controller area network (CAN), an Ethernet network, a local interconnect network (LIN), and a FlexRay network.

The certificate revocation list checking unit can request and obtain the certificate revocation list at a vehicle head unit of the vehicle coupled to a vehicle gateway of the vehicle via an in-vehicle network, and determines whether the received certificate is included in the certificate revocation list.

The certificate revocation list can be acquired from a mobile device engaged with the vehicle head unit via a Bluetooth pairing.

The certificate revocation list which is the latest version can be obtained from an authorization server by a predetermined application installed in the mobile device.

The certificate revocation list can be acquired from an authorization server engaged with the vehicle head unit via a telematics network.

The controller can block a connection between the diagnosis device and the vehicle when the received certificate is included in the certificate revocation list.

The certificate can include information sections about a possessor's role and power, and certificate rating identification unit determines a difference of the rating of the certificate based on the information about the possessor's role and power.

The apparatus may further include an electronic signature confirm unit decoding an encrypted electronic signature encrypted based on a personal key of an authorization server using a public key of the authorization server, which is previously stored, to determine a validity of the electronic signature. The encrypted electronic signature may be included in the received certificate.

The controller can perform the security key authorization process after the integrity checking process is successfully complete when the integrity checking process is performed in response to the rating of the certificate.

Furthermore, according to embodiments of the present disclosure, a non-transitory computer readable medium stores a program causing a computer to execute vehicle security process. The vehicle security process includes: receiving a certificate from a diagnosis device; recognizing a rating of the certificate; and performing at least one of an integrity checking process and a security key authorization process according to the rating of the certificate to determine whether the diagnosis device is allowed to access to a vehicle.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
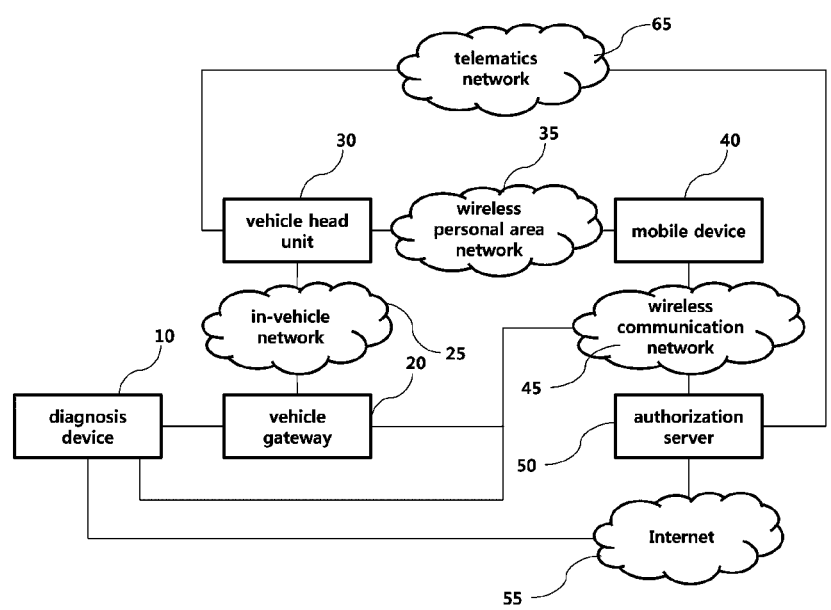
FIG. 1 shows a system for vehicle security access based on a certificate.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

As used herein, suffixes "module" and "unit" of elements herein are used for convenience of description and thus can be used interchangeably and do not have any distinguishable meanings or functions. The terms "a" or "an", as used herein, are defined as one or more than one. The term "another", as used herein, is defined as at least a second or more. The terms "including" and/or "having" as used herein, are defined as comprising (i.e., open transition). The term "coupled" or "operatively coupled" as used herein, is defined as connected, although not necessarily directly, and not necessarily mechanically.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the description of the disclosure, certain detailed explanations of related art are omitted when it is deemed that they may unnecessarily obscure the essence of the disclosure. The features of the present disclosure will be more clearly understood from the accompanying drawings and should not be limited by the accompanying drawings. It is to be appreciated that all changes, equivalents, and substitutes that do not depart from the spirit and technical scope of the present disclosure are encompassed in the present disclosure.

Referring now to the disclosed embodiments, FIG. 1 shows a system for vehicle security access based on a certificate.

As shown in FIG. 1, the system for vehicle security access can include a diagnosis device 10, a vehicle gateway 20, a vehicle head unit 30, a mobile device 40, and an authentication server 50.

The diagnosis device 10 can communicate with the vehicle gateway 20 via wired and/or wireless communication. By the way of example but not limitation, the diagnosis device 10 can communicate with the vehicle gateway 20 throughout a kind of wired communication interface such as an RS-232C communication cable, an USB communication cable, or the like. In addition, the diagnosis device 10 can exchange information or data with the vehicle gateway 20 via a wireless personal area network such as a Bluetooth, a Wi-Fi, a ZigBee, or the like.

For example, the diagnosis device 10 can receive a certificate, including a public key of diagnosis device 10, from the authorization server 50 via Internet 55. In this case, the diagnosis device 10 can access the Internet 55 via a wireless access point (AP). Further, the diagnosis device 10 can receive the certificate from the authorization server 50 via a wireless communication network 45. Further, the diagnosis device 10 can receive the certificate from the authorization server 50 via a telematics network 65.

The diagnosis device 10 can transmit, to the vehicle gateway 20, the certificate which is delivered from the authorization server 50 for vehicle security access.

In the vehicle gateway 20, a server public key issued by the authorization server 50 is stored or maintained.

If receiving the certificate from the diagnosis device 10, the vehicle gateway 20 can determine validity of electronic signature included in the certificate by using the server public key.

As a result, if the electronic signature is valid, the vehicle gateway 20 can recognize certificate's rating based on possessor's role and power information included in the certificate. Herein, according to the possessor's role and power information, both a kind of electric control devices engaged with, or controlled by, the diagnosis device 10 and a kind of information collected from electric control devices included in a vehicle can be determined.

The vehicle gateway 20, in response to recognized certificate's rating, can execute at least one of a validity term checking process, a certificate revocation list (CRL) checking process, and a security key authorization process.

For example, the vehicle gateway 20 can perform the security key authorization process if the certificate's rating is a first class, perform the validity term checking process and the security key authorization process if the certificate's rating is a second class, and perform all of the validity term checking process, the certificate revocation list (CRL) checking process and the security key authorization process if the certificate's rating is a third class.

By the way of example but not limitation, the first, second, and third classes are used. The number of classes within certificate's rating can be adjusted according to system's design or implementation for vehicle security access. Further, a process executed in response to certificate's rating can be added or removed for vehicle security access.

Hereinafter, it is assumed that the certificate can have one of three classes distinguished from each other.

For example, when the certificate's rating is the second class, the vehicle gateway 20 can first acquire current date information from the mobile device 40 engaged with the vehicle, and compare the current date information with a term of validity included in the certificate to thereby determine whether the certificate is valid. As a result, when the term of validity of the certificate is not expired, the vehicle gateway 20 can perform the security key authorization process. Herein, the security key authorization process would be described later in detail with other drawings.

Referring to FIG. 1, the vehicle gateway 20 requests current date information at the vehicle head unit 30 via an in-vehicle network 25, and the vehicle head unit 30 can receive the current date information from the mobile device 40 via a wireless personal area network 35. Then, the vehicle head unit 30 can transfer the current date information to the vehicle gateway 20 throughout the in-vehicle network 25. If the vehicle head unit 30 includes a navigation device or a module configured to receive a signal of Global Positioning System (GPS), the vehicle head unit 30 can extract current date information by itself and transmit the extracted current date information to the vehicle gateway 20.

By the way of example but not limitation, the in-vehicle network includes at least one of a controller area network (CAN), an Ethernet network, a local interconnect network (LIN), and a FlexRay network.

The wireless personal area network 35 between the vehicle head unit 30 and the mobile device 40 can include a Bluetooth communication, by the way of example but not limitation. As the wireless personal area network 35, near field communication (NFC), radio frequency identification (RFID) communication, and so on can be used.

By the way of example but not limitation, communication between the vehicle gateway 20 and vehicle head unit 30 can be performed throughout one of a controller area network (CAN), an Ethernet network, a local interconnect network (LIN), and a FlexRay network.

If the term of validity in the certificate is ended (e.g., expired), the vehicle gateway 20 can block the diagnosis device 10 to access to the vehicle.

For example, when the certificate's rating is the third class, the vehicle gateway 20 can execute the validity term checking process as well as the certificate revocation list (CRL) checking process.

Hereinafter, the certificate revocation list (CRL) checking process is described in detail.

As the certificate revocation list (CRL) checking process starts, the vehicle gateway 20 can transmit, to the vehicle head unit 30, a message for requesting a predetermined certificate revocation list. When receiving the message for requesting a predetermined certificate revocation list, the vehicle head unit 30 can determine whether to access to the authentication server 50 via a telematics network 65. As a result, if possible to engage with the authentication server 50 throughout the telematics network 65, the vehicle head unit can obtain a certificate revocation list from the authorization server 50. Then, the vehicle head unit 30 can transfer the obtained certificate revocation list to the vehicle gateway 20 via the in-vehicle network 25.

As a result, if not available to engage with the authorization server 50 via the telematics network 65, the vehicle head unit 30 can determine whether there is the mobile device 40 coupled via the wireless personal area network 35. For example, the vehicle head unit 30 can determine whether there is the mobile device 40 connected to the vehicle head unit 30 via a Bluetooth pairing. If there is connected mobile device 40 via a Bluetooth pairing, the vehicle head unit 30 can transmit a message for requesting a certificate revocation list to the mobile device 40. The mobile device 40, responsive to the received message for requesting the certificate revocation list, can access to the authorization server 50 via a wireless communication network 45 and acquire the certificate revocation list from the authorization server 50. Then the mobile device 40 can transfer the acquired certificate revocation list to the vehicle gateway 20 throughout the vehicle head unit 30.

The vehicle gateway 20 can determine whether the received certificate from the diagnosis device 10 is included in the certificate revocation list. As a result, if the certificate delivered from the diagnosis device 10 is contained in the certificate revocation list, the vehicle gateway 20 can block the diagnosis to access to the vehicle. However, when the certificate delivered from the diagnosis device 10 is not on the certificate revocation list, the vehicle gateway 20 can execute the security key authorization process.

In the mobile device 40, a predetermined application for obtaining a certificate revocation list can be installed. In this case, the mobile device 40 can access the authorization server 50 according a predetermined procedure, obtain the last-version certificate revocation list, and maintain the last-version certificate revocation list in an internal recording area. If arranged for Bluetooth connection with the vehicle head unit 30, the mobile device 50 calls the last-version certificate revocation list, previous stored, and transmits the called certificated revocation list to the vehicle head unit 30. The vehicle head unit 30 can transfer the delivered certificated revocation list to the vehicle gateway 20 via the in-vehicle network 25. Accordingly, the vehicle gateway 20 can have the certificate revocation list of update version without accessing to the authorization server 50 separately.

Figure 2:
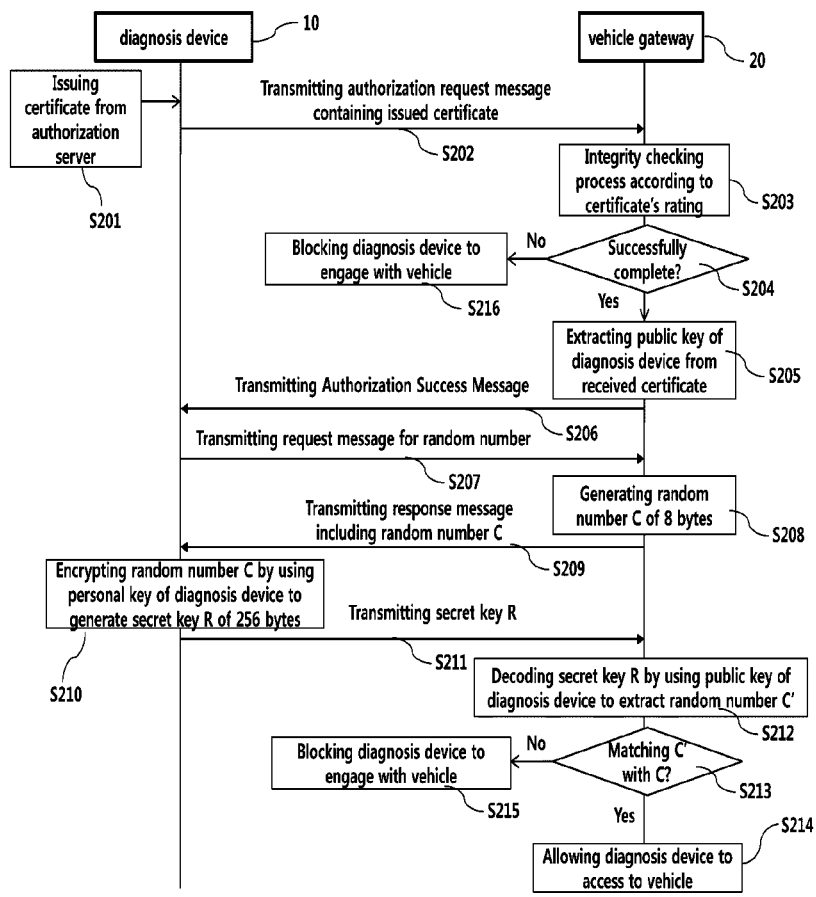
FIG. 2 describes a method for vehicle security access based on a certificate.

FIG. 2 describes a method for vehicle security access based on a certificate.

As shown, after receiving a certificate from the authorization server 50, the diagnosis device 10 can transmit, to the vehicle gateway 20 in response to a given input, a predetermined authorization request message including the previously issued certificate (S201, S202). Herein, the issued certificate can include a public key of diagnosis device.

The vehicle gateway 20 can recognize a rating of the received certificate, and execute an integrity checking process in response to the certificate's rating (S203). Herein, the integrity checking process can contain at least one of the validity term checking process and the certificate revocation list checking process described in FIG. 1. According to the certificate's rating, it is possible that the integrity checking process is not performed.

The vehicle gateway 20 can determine whether the integrity checking process is successfully complete (S204). As a result, if the integrity checking process is successfully complete, the public key of diagnosis device included in the received certificate can be extracted (S205). Otherwise, if the result says that the integrity checking process fails, the vehicle gateway 20 can block the diagnosis device 10 to access to the vehicle (S216).

The vehicle gateway 10 can transmit, to the diagnosis device 10, a predetermined authorization response message informing that the integrity checking process is successfully complete (S206).

Then, the diagnosis device 10 and the vehicle gateway 20 can execute the security key authorization process described later.

Referring to FIG. 2, the diagnosis device 10, if receiving the authorization response message, can transfer a random number request message to the vehicle gateway 20 to thereby launch the security key authorization process (S207).

The vehicle gateway 20 can generate a random number C, having a predetermined length, in response to the random number request message, and then transfer a random number response message containing the generated random number C to the diagnosis device 10 (S208, S209). By the way of example but not limitation, the length of the random number C is 8-byte.

The diagnosis device 10 can encrypt the random number C by using a personal key of diagnosis device, e.g., a unique key assigned to each diagnosis device, to generate a secret key R having a predetermined length. By the way of example but not limitation, the length of the secret key R is 256-byte.

After the diagnosis device transmits the generated secret key R to the vehicle gateway 20 (S211), the vehicle gateway 20 can decode the received secret key R by using a public key of diagnosis device to thereby extract a random number C' (S212).

The vehicle gateway 20 determines whether the extracted random number C' is the same with the generated random number C (S213).

As a result, if the extracted random number C' is the same with the generated random number C, the vehicle gateway 20 can allow the diagnosis device 10 to access to the vehicle (S214). Otherwise, if extracted random number C' is different from the generated random number C, the vehicle gateway 20 can block the diagnosis device 10 to access to the vehicle (S215).

Figure 3:
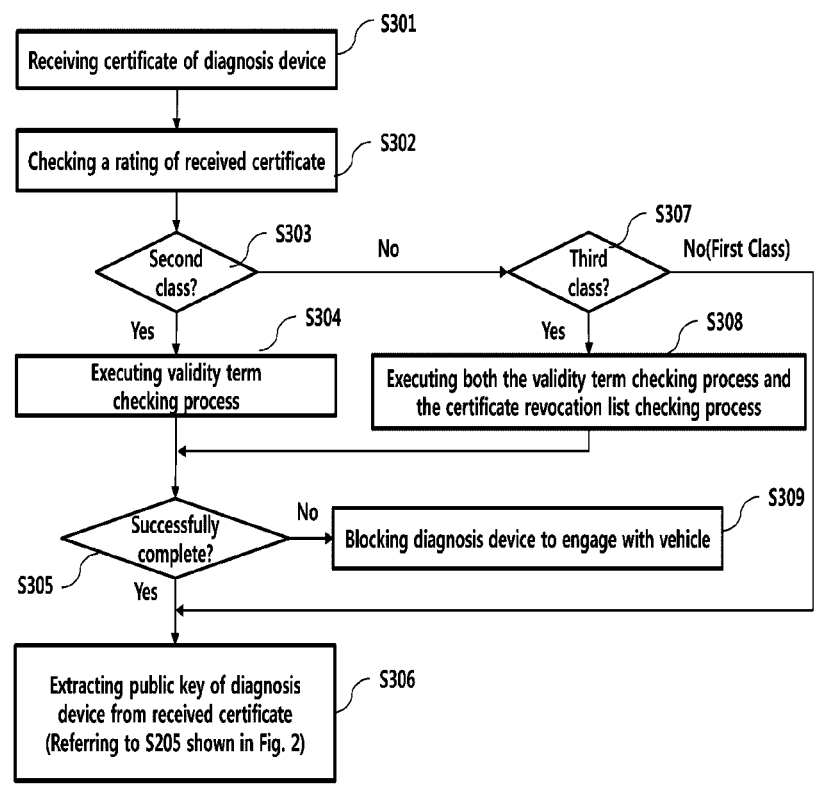
FIG. 3 shows a method for controlling vehicle security access according to certificate's rating.

FIG. 3 shows a method for controlling vehicle security access according to certificate's rating.

As shown, the vehicle gateway 20, if receiving a certificate from the diagnosis device 10, can recognize a rating of the received certificate (S301, S302).

First, if the certificate's rating is a second class, the vehicle gateway 20 starts the validity term checking process (S304).

After the validity term checking process is successfully complete, the vehicle gateway 20 can perform the process S205 described in FIG. 2 (S305, S306).

When the certificate's rating is a third class, the vehicle gateway 20 begins the validity term checking process as well as the certificate revocation list checking process (S307, S308).

If both the validity term checking process and the certificate revocation list checking process are successfully complete, the vehicle gateway 20 can execute the process S306 described above.

Otherwise, if the certificate's rating is a first class, the vehicle gateway 20 can perform the process S306 described above.

If at least one of the validity term checking process and the certificate revocation list checking process is not successfully complete, the vehicle gateway 20 can block the diagnosis device 10 to engage with vehicle (S309).

Figure 4:
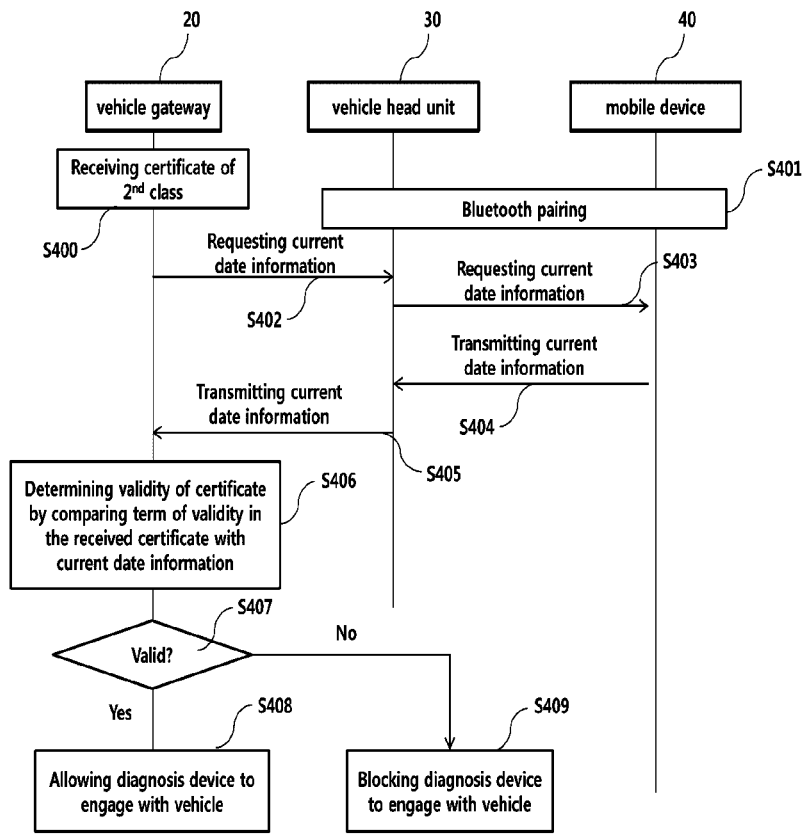
FIG. 4 concretely illustrates the method for controlling vehicle security access shown in FIG. 3.

FIG. 4 concretely illustrates the method for controlling vehicle security access shown in FIG. 3.

Particularly, FIG. 4 is a flowchart describing the validity term checking process, shown in FIG. 3, in detail.

As shown in FIG. 4, if a certificate of second class is delivered from the diagnosis device 10, the vehicle gateway 20 can request current date information at the vehicle head unit 30 (S400, S401).

In a case when a Bluetooth pairing between the vehicle head unit 30 and the mobile device 40 exists (S401), the vehicle head unit 30 can request the current date information via an established Bluetooth channel (S401, S403).

The mobile device 40 can collect the current date information, and transmit the collected current date information to the vehicle gateway 20 throughout the vehicle head unit 30 (S404, S405).

The vehicle gateway 20 can compare a term of validity included in the certificate with the current date information delivered from the mobile device 40 to thereby determine whether the term of validity in the certificate is expired (S406).

As a result, when the term of validity in the certificate is not expired (i.e., the certificate is valid), the vehicle gateway 20 can allow the diagnosis device 10 to access to the vehicle (S408). Otherwise, if the term of validity in the certificate is ended, the vehicle gateway 20 can block the diagnosis device 10 to access to the vehicle (S409).

In FIG. 4, after obtaining the current date information from the mobile device 40, the vehicle head unit 30 transfers the current data information to the vehicle gateway 20. However, in a case when a navigation device or a module configured to receive a signal of Global Positioning System (GPS) is included in the vehicle head unit 30, the vehicle head unit 30 can collect current date information by itself and transmit the collected current date information to the vehicle gateway 20.

Further, the vehicle gateway 20, if containing a wireless communication module, can directly acquire the current date information from a wireless communication network 45 shown in FIG. 1.

Further, the vehicle gateway 20 can obtain the current date information from the diagnosis device 10.

Figure 5:
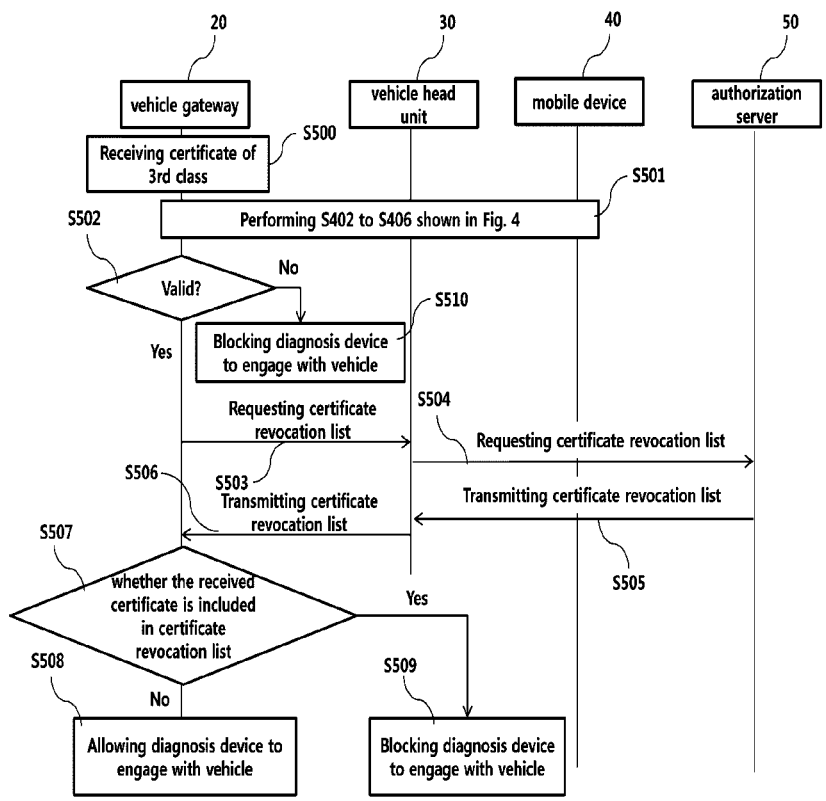
FIG. 5 concretely illustrates the method for controlling vehicle security access shown in FIG. 3.

FIG. 5 concretely illustrates the method for controlling vehicle security access shown in FIG. 3.

Particularly, FIG. 5 is a flowchart describing the certificate revocation list checking process, shown in FIG. 3, in detail.

As shown in FIG. 5, if the vehicle gateway 20 receives a certificate of third class which is delivered from the diagnosis device 10, the processes S402 to S406 shown in FIG. 4 are performed (S501).

In a case when the certificate is considered valid throughout the validity term checking process, the vehicle gateway 20 can transmit a message for requesting a certificate revocation list to the vehicle head unit 30 (S502, S503).

The vehicle head unit 30 can receive the certificate revocation list from the authorization server 50, and transmit the received certificate revocation list to the vehicle gateway 20 (S504, S506).

The vehicle gateway 20 can determine whether the certificate delivered from the diagnosis device 10 is on the certificate revocation list (S407).

As a result, if the certificate delivered from the diagnosis device 10 is not on the certificate revocation list, the vehicle gateway 20 can allow the diagnosis device 10 to engage with vehicle (S508). Otherwise, if the certificate delivered from the diagnosis device 10 is included in the certificate revocation list, the vehicle gateway 20 can block the diagnosis device 10 to engage with vehicle (S509).

In the process S502, if the term of validity in the certificate is expired, the vehicle gateway 20 can block the diagnosis device 10 to engage with vehicle (S510).

Figure 6:
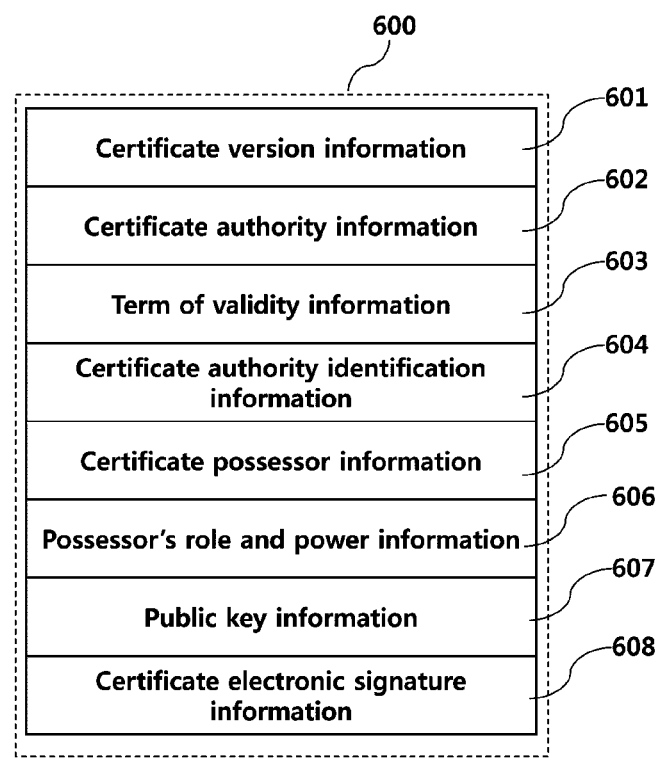
FIG. 6 describes certificate's structure.

FIG. 6 describes certificate's structure.

As shown, a certificate 600 issued to the diagnosis device 10 by the authorization server 50 can include several sections, or fields, of certification version information 601, certificate authority information 602, term of validity information 603, certificate authority identification information 604, certificate possessor information 605, possessor's role and power information 606, public key information 607, and certificate electronic signature information 608.

The certification version information 601 can inform a version of each certificate which considered a certificate profile identifier.

The certificate authority information 602 can contain data about an authority issuing the corresponding certificate and/or a predetermined unique identifier for distinguishing the authority from others. The certificate authority information 602 can include data about at least one of a root certification authority (CA) and an intermediate certification authority (CA), identifiers of each CA, lengths of each identifier, a sequence number, and the like.

The term of validity information 603 can include an issuing date and an expiration date of the corresponding certificate.

The certificate possessor information 605 can contain at least one of unique identifier for distinguishing certificate's possessor from others.

The possessor's role and power information 606 can include data for identifying purposes of the corresponding certificate and access privileges of certificate against the vehicle. For example, the vehicle gateway 20 can determines certificate's rating based on the possessor's role and power information 606.

The public key information 607 can include an identifier for public key and elements of public key. By the way of example but not limitation, the elements of public key include a public exponent, a modulus, and so on.

The certificate electronic signature information 608 is a kind of data encrypted based on a personal key stored in the authorization server 50. The vehicle gateway 20 can use a public key of authorization server 50 to determine the validity of electronic signature included in the certificate.

Figure 7:
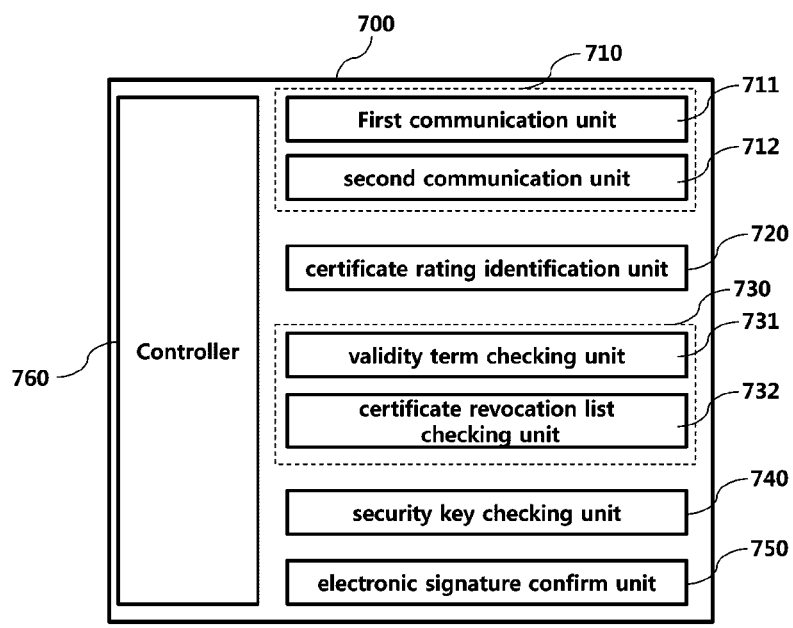
FIG. 7 shows an apparatus for vehicle security access.

FIG. 7 shows an apparatus for vehicle security access.

By the way of example but not limitation, a vehicle security access apparatus 700 can be implemented in the vehicle gateway 20. Further, the vehicle security access apparatus 700 can be included or adapted in any one of devices capable of providing an interface, or a function, for communicating with the diagnosis device 10.

As shown in FIG. 7, the vehicle security access apparatus 700 can include a communication unit 710, a certificate rating identification unit 720, a integrity checking unit 730, a security key checking unit 740, an electronic signature confirm unit 750, and a controller 760.

The communication unit 710 can contain a first communication unit configured to provide communication with the diagnosis device 10, and a second communication unit 712 configured to provide communication with plural electric devices inside the vehicle throughout an in-vehicle network. Particularly, the vehicle security access apparatus 700 can receive a certificate, issued by the authorization server 50, from the diagnosis device 10 via the first communication unit 711. Further, throughout the second communication unit 712, the vehicle security access apparatus 700 can provide gateway to, or communication with, the vehicle head unit 30 as well as plural electric devices inside the vehicle.

The certificate rating identification unit 720 can recognize a rating of certificate delivered from the diagnosis device 10. By the way of example but not limitation, certificate's rating can be identified based on possessor's role and power information 606. For example, certificate's rating can be identified in response to at least one of the certificate authority information 602, the certificate authority identification information 604, and the certificate possessor information 605.

The integrity checking unit 730 can provide a function of checking certificate's integrity, and be mainly split into two parts: a validity term checking unit 731 and a certificate revocation list checking unit 732.

The validity term checking unit 731 can compare an expiration date, included in the certificate delivered from the diagnosis device 10, with the current date information transmitted throughout the vehicle head unit 30. In response to the comparison result, the validity term checking unit 731 can determine whether the term of validity of the certificate is expired. Further, the validity term checking unit 731 can output the decision about validity to the controller 760. The controller 760, if assuring that the term of validity of the certificate is expired, can block the diagnosis device 10 to access to the vehicle. Otherwise, when the term of validity of the certificate is not expired, the controller 760 can control execution of the certificate revocation list checking process, the security key authorization process, or etc.

After receiving a certificate revocation list from the vehicle head unit 30, the certificate revocation list checking unit 732 can determine whether the received certificate is on the certificate revocation list, and deliver the determination result to the controller 760. The controller 760, if the received certificate is on the certificate revocation list, can block the diagnosis device 10 to access to the vehicle. Otherwise, when the received certificate is not included in the certificate revocation list, the controller 760 can control execution of the security key authorization process.

For example, the certificate revocation list checking unit 732 can request at, and obtain from, the vehicle head unit 30 coupled throughout the in-vehicle network, the certificate revocation list. Then, the certificate revocation list checking unit 732 can determine whether the certificate delivered from the diagnosis device 10 is on the certificate revocation list.

For another example, the certificate revocation list checking unit 732 can transmit a certificate revocation inquiry message including a certificate identification information to the authorization server 50, and receive a certificate revocation response message containing a predetermined identification information indicating whether the certificate is revoked, in order to determine whether the certificate delivered from the diagnosis device 10 is on the certificate revocation list.

The security key checking unit 740, if receiving a message for requesting a random number from the diagnosis device 10, can generate a random number C of a predetermined length and transmit the random number C to the diagnosis device 10. When receiving a secret key R from the diagnosis device 10, the security key checking unit 740 can decode the secret key R based on a public key of diagnosis device included in the certificate to thereby extract a random number C'. The security key checking unit 740 can examine whether the generated random number C is the same with the extracted random number C', and deliver the examination result into the controller 760. After the security key authorization process is successfully complete, i.e., if the generated random number C is the same with the extracted random number C', the controller 760 can allow the diagnosis device 10 to access to the vehicle. Otherwise, the controller 760 can block the diagnosis device 10 to access to the vehicle.

The electronic signature confirm unit 750 can determine validity of an electronic signature contained in the certificate delivered from the diagnosis device 10, and transfer the decision about validity to the controller 760.

Herein, in order to determine whether the electronic signature is valid, while the electric signature included in the certificate can be encrypted based on a personal key of authorization server 50, the electronic signature confirm unit 750 can decode the encrypted electric signature by using a public key of authorizations server 50.

As above described, embodiments can provide a method and an apparatus for controlling vehicle security access based on a certificate.

Further, embodiments can provide a method and an apparatus, adapted in a vehicle, configured to collect, and analyze, the validity term of certificate and certificate revocation list, according to a certificate's rating, in order to control access security for use in a vehicle.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for controlling access security at a vehicle gateway of a vehicle in communication with a diagnosis device through the vehicle gateway, the method comprising:
    receiving, at the vehicle gateway, a certificate from the diagnosis device;
    recognizing, by the vehicle gateway, a rating of the certificate, wherein the rating of the certificate is one of a first class, a second class, and a third class;
    performing, by the vehicle gateway, a security key authorization process when the rating of the certificate is the first class;
    performing by the vehicle gateway, the security key authorization process and a validity term checking process when the rating of the certificate is the second class; and
    performing, by the vehicle gateway, the security key authorization process, the validity term checking process, and a certificate revocation list checking process when the rating of the certificate is the third class.

2. The method according to claim 1, wherein the validity term checking process includes verifying a term of validity in the received certificate; and the certificate revocation list checking process includes determining whether the received certificate is included in a certificate revocation list.

3. The method according to claim 2, wherein the validity term checking process further includes:
    either acquiring current date information from a vehicle head unit coupled to the vehicle gateway via an in-vehicle network or directly obtaining the current date information via a mobile communication network by the vehicle gateway; and
    determining whether the term of validity has ended by comparing an expiration date included in the received certificate with the current date information.

4. The method according to claim 3, further comprising:
    blocking a connection between the diagnosis device and the vehicle when the term of validity has expired.

5. The method according to claim 3, wherein the current date information is acquired by a mobile device in communication with the vehicle head unit via a Bluetooth pairing.

6. The method according to claim 3, wherein the current date information is obtained from a communication module of a Global Positioning System (GPS) in the vehicle head unit.

7. The method according to claim 3, wherein the in-vehicle network includes at least one of a controller area network (CAN), an Ethernet network, a local interconnect network (LIN), and a FlexRay network.

8. The method according to claim 2, wherein the certificate revocation list checking process further includes:
    requesting and obtaining the certificate revocation list at a vehicle head unit coupled to the vehicle gateway via an in-vehicle network; and
    determining whether the received certificate is included in the certificate revocation list.

9. The method according to claim 8, wherein the certificate revocation list is acquired from a mobile device engaged with the vehicle head unit via a Bluetooth pairing.

10. The method according to claim 9, wherein a latest version of the certificate revocation list is obtained from an authorization server by a predetermined application installed in the mobile device.

11. The method according to claim 8, wherein the certificate revocation list is acquired from an authorization server engaged with the vehicle head unit via a telematics network.

12. The method according to claim 8, further comprising:
blocking a connection between the diagnosis device and the vehicle head unit when the received certificate is included in the certificate revocation list.

13. The method according to claim 1, wherein the certificate includes information about a possessor's role and power, and the rating of the certificate is distinguished based on the information about the possessor's role and power.

14. The method according to claim 1, further comprising:
decoding an electronic signature encrypted based on a personal key stored in an authorization server using a public key of the authorization server, which is previously stored, to determine a validity of the electronic signature,
wherein the encrypted electronic signature is included in the received certificate.

15. The method according to claim 1, wherein:
the security key authorization process is performed after the integrity checking process is successfully completed when the integrity checking process is performed in response to the rating of the certificate.

16. The method according to claim 2, wherein the certificate revocation list checking process further includes:
transmitting a certificate revocation inquiry message including certificate identification information to an authorization server; and
receiving a certificate revocation response message containing predetermined identification information indicating whether the certificate is revoked.

17. A vehicle gateway for controlling access security in a vehicle, the apparatus comprising:
a communication unit receiving a certificate from a diagnosis device;
a certificate rating identification unit recognizing a rating of the certificate, wherein the rating of the certificate is one of a first class, a second class, and a third class;
an integrity check unit performing an integrity checking process and a validity term checking process according to the rating of the certificate; and
a control unit controlling an execution of at least one of an integrity checking process and a security key authorization process according to the rating of the certificate to determine whether the diagnosis device is allowed to access to the vehicle, wherein
the vehicle gateway performs the security key authorization process when the rating of the certificate is the first class;
the vehicle gateway performs the security key authorization process and the validity term checking process when the rating of the certificate is a second class; and
the vehicle gateway performs the security key authorization process, the validity term checking process, and a certificate revocation list checking process when the rating of the certificate is a third class.

18. The vehicle gateway according to claim 17, wherein the integrity check unit includes:
a validity term checking unit verifying a term of validity in the received certificate; and
a certificate revocation list checking unit determining whether the received certificate is included in a certificate revocation list,
wherein the control unit controls the execution of at least one of the validity term checking unit and the certificate revocation list checking unit according to the rating of the certificate.

19. The vehicle gateway according to claim 18, wherein the validity term checking unit either acquires current date information from a vehicle head unit of the vehicle coupled to a vehicle gateway of the vehicle via an in-vehicle network or directly obtains the current date information via a mobile communication network by the vehicle gateway, and determines whether the term of validity has ended by comparing an expiration date included in the received certificate from the diagnosis device with the current date information.

20. The vehicle gateway according to claim 17, further comprising:
an electronic signature confirm unit decoding an encrypted electronic signature encrypted based on a personal key of an authorization server using a public key stored in the authorization server, which is previously stored, to determine a validity of the electronic signature,
wherein the encrypted electronic signature is included in the received certificate.

* * * * *